United States Patent [19]

Ikai et al.

[11] Patent Number: 5,304,622
[45] Date of Patent: Apr. 19, 1994

[54] PROCESS FOR PRODUCING POLYSILANES

[75] Inventors: Keizo Ikai, Hayama; Masaki Minami; Mitsuo Matsuno, both of Yokohama, all of Japan

[73] Assignee: Nippon Oil Company, Ltd., Tokyo, Japan

[21] Appl. No.: 998,626

[22] Filed: Dec. 30, 1992

[30] Foreign Application Priority Data

Jan. 8, 1992 [JP] Japan .................................. 4-18429
Jan. 8, 1992 [JP] Japan .................................. 4-18431

[51] Int. Cl.$^5$ ............................................. C08G 77/06
[52] U.S. Cl. ........................................ 528/16; 528/17; 528/18; 528/31
[58] Field of Search ....................... 528/31, 16, 17, 18

[56] References Cited

U.S. PATENT DOCUMENTS 5,153,295 10/1992 Whitmarsh et al. .................. 528/31
5,204,380 4/1993 Seyferth et al. ...................... 528/31

OTHER PUBLICATIONS

Woo et al., "Dehydrogenative Polymerization of Silanes to Polysilanes by Zirconocene and Hafnocene Catalysts. A New Polymerization Mechanism", J. Am. Chem. Soc., vol. 111, pp. 8043-8044 (1989).
Corey et al., "Condensation of Primary Silanes in the Presence of Cp$_2$MCl$_2$/$^n$ BuLi(M=Ti,Zr,Hf)", Journal of Organometallic Chemistry, vol. 439, pp. 1-17 (1992).
Woo et al., "Dehydropolymerization of Bis- and Tris(silyl)arenes to Highly Cross-linked Disilanylenearylene Polymers, Catalyzed by [($\eta^5$-C$_5$H$_5$)($\eta^5$—C$_5$Me$_5$) ZrH$_2$]$_2$", Macromolecules, vol. 24, No. 26, pp. 6863-6866, (Dec. 1991).

Primary Examiner—Melvyn I. Marquis
Attorney, Agent, or Firm—Wenderoth, Lind & Ponack

[57] ABSTRACT

Polysilanes are produced from hydrosilanes using as a catalyst a mixture of a specific metallocene compound and a specific silyl compound or a mixture of the specific metallocene compound and a specific metallic hydride.

This invention can efficiently provide a polymer having a higher degree of polymerization than in case of using a known catalyst.

2 Claims, No Drawings

PROCESS FOR PRODUCING POLYSILANES

This invention relates to a process for producing polysilanes, and more specifically to a process for producing polysilanes from a silane compound monomer using as a catalyst a mixture of a specific metal complex and a specific silyl compound or a mixture of the specific metal complex and a specific metallic hydride.

PRIOR ART

Polysilanes have been expected to be used as electronic materials of semiconductors, conductors, etc., non-linear optical materials, light reactive materials such as photoresists, photopolymerization initiators, etc., or ceramic precursors, and have lately aroused a great deal of interest.

The polysilanes have been ordinarily produced via a method represented by reaction (7).

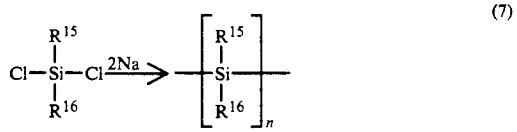
(7)

wherein $R^{15}$ and $R^{16}$ each denote a hydrocarbon group.

This method, however, costs much because metallic sodium is used in an amount of 2 mols per mole of the silane compound monomer. Further, metallic sodium involves risk of fire and is therefore hard to handle. Still further, since a large amount of sodium chloride is by-produced, a step of removing sodium chloride from polysilanes is needed.

Accordingly, investigations have been made in recent years on production of polysilanes by dehydrocondensation of hydrosilanes using a complex catalyst according to a method represented by reaction (8).

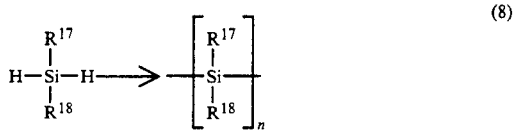
(8)

wherein $R^{17}$ denotes an alkyl group, a substituted alkyl group, a phenyl group, a substituted phenyl group or a RR'R"Si-type silyl group having a substituent such as an alkyl group or a phenyl group, $R^{18}$ denotes hydrogen, an alkyl group, a substituted alkyl group, a phenyl group, a substituted phenyl group or a RR'R"Si-type silyl group having a substituent such as an alkyl group or a phenyl group, provided R, R' and R" are each selected from hydrogen, an alkyl group having 1 to 12 carbon atoms, an aralkyl group or an aryl group having 6 to 12 carbon atoms, and they may be the same or different.

Cp$_2$TiMe$_2$ [J. Am. Chem. Soc., 108, 4059 (1986)], Cp$_2$TiPh$_2$ [Chem. Lett., 1989, 83] Cp$_2$ZrMe$_2$ [Can. J. Chem., 64, 1677 (1986)], Ni(dppp)Me$_2$ [Japanese Laid-open Patent Application (Kokai) No. 198631/1989], RuCl$_2$(PPh$_3$)$_3$, HRh(CO)(PPh$_3$)$_3$, PtCl$_2$(PPh$_3$)$_2$ [Nikka 58th Spring Annual Meeting, IIIA 31, 1989], etc. have been so far developed as a catalyst. Nevertheless, only polymers such as a tetracontamer are obtained from trihydrosilanes; oligomers such as a dimer and a trimer are obtained from dihydrosilanes.

It is an object of this invention to provide a process for producing, from hydrosilanes, polysilanes having a higher degree of polymerization than in the presence of a known catalyst, upon using a catalyst system which is less costly and easier to obtain than the known catalyst.

OUTLINE OF THE INVENTION

In the above situation, the present inventors have made assiduous investigations, and consequently have found that when using a mixture of a specific metal complex and a specific silyl compound or a mixture of the specific metal complex and a specific metallic hydride as a catalyst, polysilanes can be produced more efficiently from hydrosilanes. This finding has led to completion of this invention.

Namely, according to the first embodiment of this invention, there is provided a process for producing polysilanes which comprises reacting hydrosilanes using as a catalyst a mixture of (A) a metallocene compound represented by formula (1)

(2)

wherein M denotes Ti, Zr, or Hf, L and L' are each selected from unsubstituted cyclopentadienyl, cyclopentadienyl substituted with an alkyl group having 1 to 6 carbon atoms, cyclopentadienyl substituted with a silyl group represented by formula (2)

(2)

wherein $R^1$, $R^2$ and $R^3$ are each selected from hydrogen, an alkyl group having 1 to 12 carbon atoms, an aralkyl group or an aryl group having 6 to 12 carbon atoms, and they may be the same or different,
unsubstituted indenyl, indenyl substituted with an alkyl group having 1 to 6 carbon atoms or indenyl substituted with the silyl group of formula (2), and L and L' may be the same or different and may be crosslinked with alkylene having 1 to 4 carbon atoms or silylene represented by formula (3)

(3)

wherein $R^7$ and $R^8$ each denote, hydrogen, an alkyl group having 1 to 12 carbon atoms, an aralkyl group or an aryl group having 6 to 12 carbon atoms, and they may be the same or different, and (B) a silyl compound represented by formula (4)

(4)

wherein $R^9$, $R^{10}$ and $R^{11}$ are each selected from a linear or branched alkyl group having 1 to 12 carbon atoms, an aralkyl group, an aryl group having 6 to 12 carbon atoms or a silyl group represented by formula (5)

(5)

wherein $R^{12}$, $R^{13}$ and $R^{14}$ are selected from an alkyl group having 1 to 8 carbon atoms or an aryl group, and they may be the same or different, and
A denotes Li, Na or K.

According to the second embodiment of this invention, there is provided a process for producing polysilanes which comprises reacting hydrosilanes using as a catalyst a mixture of (A) a metallocene compound represented by formula (1)

$$LL'MCl_2 \qquad (1)$$

wherein M denotes Ti, Zr or Hf, L and L' are each selected from unsubstituted cyclopentadienyl, cyclopentadienyl substituted with an alkyl group having 1 to 6 carbon atoms, cyclopentadienyl substituted with a silyl group represented by formula (2)

$$R^1R^2R^3Si- \qquad (2)$$

wherein $R^1$, $R^2$ and $R^3$ are each selected from hydrogen, an alkyl group having 1 to 12 carbon atoms, an aralkyl group or an aryl group having 6 to 12 carbon atoms, and they may be the same or different, unsubstituted indenyl, indenyl substituted with an alkyl group having 1 to 6 carbon atoms or indenyl substituted with the silyl group of formula (2), and L and L' may be the same or different and may be crosslinked with alkylene having 1 to 4 carbon atoms or silylene represented by formula (3)

$$\begin{array}{c} R^7 \\ | \\ -Si- \\ | \\ R^8 \end{array} \qquad (3)$$

wherein $R^7$ and $R^8$ each denote hydrogen, an alkyl group having 1 to 12 carbon atoms, an aralkyl group or an aryl group having 6 to 12 carbon atoms, and they may be the same or different, and
(B') a metallic hydride represented by formula (6) A'Xn (6) wherein A' denotes Li, Na, K, Ca, Al, $R^4_{(3-n)}$Al, LiAl, LiAlR$^5_{(4-n)}$, NaAlR$^5_{(4-n)}$, B, $R^4_{(3-n)}$B, LiB, LiBR$^5$, NaB, KB or $R^6$B, $R^4$; and denotes an alkyl group having 1 to 5 carbon atoms, $R^5$ denotes an alkyl or alkoxyl group having 1 to 8 carbon atoms, $R^6$ denotes a quaternary ammonium group having 1 to 4 carbon atoms, provided when $R^4$, $R^5$ and $R^6$ are present in plural number, they may be the same or different, X denotes hydrogen or heavy hydrogen, and n is an integer of 1 to 4.

This invention will be explained in more detail below.

In the first embodiment of this invention, the mixture of the metallocene compound of formula (1) and the silyl compound of formula (4) is used as a catalyst.

Examples of the metallocene compound represented by formula (1) are dichlorobis(eta-cyclopentadienyl)titanium, dichlorobis(eta-methylcyclopentadienyl)titanium, dichlorobis(eta-dimethylcyclopentadienyl)titanium, dichlorobis(eta-trimethylcyclopentadienyl)titanium, dichlorobis(eta-pentamethylcyclopentadienyl)titanium, dichlorobis(eta-trifluoromethylcyclopentadienyl)titanium, dichlorobis(eta-trimethylsilylcyclopentadienyl)titanium, dichloro(eta-pentamethylcyclopentadienyl)(eta-cyclopentadienyl)titanium, dichloro(eta-trifluoromethylcyclopentadienyl)(eta-cyclopentadienyl)titanium, dichloromethylenebis(eta-cyclopentadienyl)titanium, dichloroethylenebis(eta-cyclopentadienyl)titanium, dichloropropylenebis(eta-cyclopentadienyl)titanium, dichlorodimethylsilylenebis(eta-cyclopentadienyl)titanium, dichlorobis(eta-indenyl)titanium, dichlorobis(eta-methylindenyl)titanium, dichlorobis(eta-dimethylindenyl)titanium, dichlorobis(eta-trimethylsilylindenyl)titanium, dichloromethylenebis(eta-indenyl)titanium, dichloroethylenebis(eta-indenyl)titanium, dichloropropylenebis-(eta-indenyl)titanium, dichlorobis(eta-cyclopentadienyl)zirconium, dichlorobis(eta-methylcyclopentadienyl)zirconium, dichlorobis(eta-dimethylcyclopentadienyl)zirconium, dichlorobis(eta-trimethylcyclopentadienyl)zirconium, dichlorobis(eta-pentamethylcyclopentadienyl)zirconium, dichlorobis(eta-trifluoromethylcyclopentadienyl)zirconium, dichlorobis(eta-trimethylsilylcyclopentadienyl)zirconium, dichloro(eta-pentamethylcyclopentadienyl)(eta-cyclopentadienyl)zirconium, dichloro(eta-trifluoromethylcyclopentadienyl)(eta-cyclopentadienyl)zirconium, dichloromethylenebis(eta-cyclopentadienyl)zirconium, dichloroethylenebis(eta-cyclopentadienyl)zirconium, dichloropropylenebis(eta-cyclopentadienyl)zirconium, dichlorodimethylsilylenebis(eta-cyclopentadienyl)zirconium, dichlorobis(eta-indenyl)zirconium, dichlorobis(eta-methylindenyl)zirconium, dichlorobis-(eta-dimethylindenyl)zirconium, dichlorobis(eta-trimethylsilylindenyl)zirconium, dichloromethylenebis(eta-indenyl)zirconium, dichloroethylenebis(eta-indenyl)zirconium, dichloropropylenebis(eta-indenyl)zirconium, dichlorobis(eta-cyclopentadienyl)hafnium, dichlorobis-(eta-methylcyclopentadienyl)hafnium, dichlorobis(eta-dimethylcyclopentadienyl)hafnium, dichlorobis(eta-trimethylcyclopentadienyl)hafnium, dichlorobis(eta-pentamethylcyclopentadienyl)hafnium, dichlorobis(eta-trifluoromethylcyclopentadienyl)hafnium, dichlorobis-(eta-trimethylsilylcyclopentadienyl)hafnium, dichloro(eta-pentamethylcyclopentadienyl)(eta-cyclopentadienyl)hafnium, dichloro(eta-trifluoromethylcyclopentadienyl)(eta-cyclopentadienyl)hafnium, dichloromethylenebis(eta-cyclopentadienyl)hafnium, dichloroethylenebis(eta-cyclopentadienyl)hafnium, dichloropropylenebis(eta-cyclopentadienyl)hafnium, dichlorodimethylsilylenebis(eta-cyclopentadienyl)hafnium, dichlorobis(eta-indenyl)hafnium, dichlorobis(eta-methylindenyl)hafnium, dichlorobis(eta-dimethylindenyl)hafnium, dichlorobis(eta-trimethylsilylindenyl)-hafnium, dichloromethylenebis(eta-indenyl)hafnium, dichloroethylenebis(eta-indenyl)hafnium, and dichloropropylenebis(eta-indenyl)hafnium. They can be used either singly or in combination.

Of the above metallocene compounds, the underlined are preferable ones.

Examples of the silyl compound represented by formula (4) are phenyldimethylsilyllithium, diphenylmethylsilyllithium, tert-butyldiphenylsilyllithium, triphenylsilyllithium, tris(trimethylsilyl)silyllithium, trimethylsilylsodium, triethylsilylsodium, tri-n-propylsilysodium, tri-i-propylsilylsodium, tri-n-butylsilylsodium, tri-n-hexylsilylsodium, triphenylsilylsodium, ethyldimethylsilylsodium, n-propyldimethylsilylsodium, i-propyldimethylsilylsodium, n-butyldimethylsilylsodium, tert-butyldimethylsilylsodium, n-hexyldimethylsilylsodium, cyclohexyldimethylsilylsodium, n-octyldimethylsilylsodium, n-decyldimethylsilylsodium, phenyldiemthylsilylsodium, benzyldimethylsilylsodium, phenetyldimethylsilylsodium, di-n-butylmethylsilylsodium, diphenylmethylsilylsodium, tert-butyldiphenylsilylsodium, tris(trimethylsilyl)silylsodium, trimethylsilylpotassium, triethylsilylpotassium, tri-n-propylsilylpotassium, tri-i-propylsilylpotassium, tri-n-butylsilylpotassium, tri-n-hexylsilylpotassium, triphenylsilylpotassium, ethyldimethylsilylpotassium, n-propyldimethylsilylpotassium, i-propyldimethylsilylpotassium, n-butyldimethylsilylpotassium, tert-butyldimethylsilylpotassium, n-hexyldimethylsilylpotassium, cyclohexyldimethylsilylpotassium, n-octyldimethylsilylpotassium, n-decyldimethylsilylpotassium, phenyldimethylsilylpotassium, benzyldimethylsilylpotassium, phenetyldimethylsilylpotassium, di-n-butylmethylsilylpotassium, diphenylmethylsilylpotassium, tert-butyldiphenylsilylpotassium, and tris(trimethylsilyl)silylpotassium. They can be used either singly or in combination.

Of the obove silyl compounds, the underlined are preferable ones.

The proportion of the metallocene compound is usually 0.01 to 10 mols, preferably 0.1 to 5 mols per 100 mols of the hydrosilanes. The proportion of the silyl compound is usually 0.005 to 50 mols, preferably 0.05 to 20 mols per 100 mols of the hydrosilanes.

Additives may be added to the catalyst. Examples of the additives are crown ethers such as 12-crown-4, 15-crown-5, 18-crown-6, benzo-12-crown-4, benzo-15-crown-5, and benzo-18-crown-6, and diamines such as tetramethylethylenediamine. The amounts of the additives are usually 0.005 to 50 mol, preferably 0.05 to 20 mols per 100 mols of the hydrosilanes.

In the first embodiment of this invention, the polysilanes are produced by reacting the hydrosilanes using the mixture of the metallocene compound and the silyl compound as a catalyst.

Hydromonosilanes, hydrodisilanes, hydrotrisilanes or mixtures of two or more thereof are ordinarily used as said hydrosilanes.

Examples of the hydromonosilanes are silane, methylsilane, ethylsilane, n-propylsilane, (3,3,3-trifluoropropyl)silane, n-butylsilane, tert-butylsilane, (1-methylpropyl)silane, (2-methylpropyl)silane, amylsilane, n-hexylsilane, cyclohexylsilane, n-heptylsilane, n-octylsilane, n-nonylsilane, n-decylsilane, n-dodecylsilane, phenylsilane, p-tolylsilane, mesitylsilane, benzylsilane, phenetylsilane, (trimethylsilylmethyl)silane, dimethylsilane, diethylsilane, di-n-propyl silane, bis(3,3,3-trifluoropropyl)silane, di-n-butylsilane, di-tert-butylsilane, di(1-methylpropyl)silane, di(2-methylpropyl)silane, diamylsilane, di-n-hexylsilane, dicyclohexylsilane, di-n-heptylsilane, di-n-octylsilane, di-n-nonylsilane, di-n-decylsilane, di-n-dodecylsilane, diphenylsilane, di-p-tolylsilane, dimethylsilane, dibenzylsilane, diphenetylsilane, bis(trimethylsilylmethyl)silane, ethylmethylsilane, methyl-n-propylsilane, methyl(3,3,3-trifluoropropyl)silane, methyl-i-propylsilane, n-butylmethylsilane, tert-butylmethylsilane, methyl(1-methylpropyl)silane, methyl(2-methylpropyl)silane, amylmethylsilane, n-hexylmethylsilane, cyclohexylmethylsilane, n-heptylmethylsilane, methyl-n-octylsilane, methyl-n-nonylsilane, n-decylmethylsilane, n-dodecylmethylsilane, methylphenylsilane, p-tolylmethylsilane, methylmesitylsilane, benzylmethylsilane, methylphenetylsilane, methyl(trimethylsilylmethyl)silane, (p-methylphenetyl)silane, ethylphenylsilane, and tert-butylphenylsilane.

Of the above hydromonosilanes, the underlined are preferable ones.

Examples of the hydrodisilanes are disilane, methyldisilane, ethyldisilane, n-propyldisilane, (3,3,3-trifluoropropyl)disilane, n-butyldisilane, tert-butyldisilane, (1-methylpropyl)disilane, (2-methylpropyl)disilane, amyldisilane, n-hexyldisilane, cyclohexyldisilane, n-heptyldisilane, n-octyldisilane, n-nonyldisilane, n-decyldisilane, n-dodecyldisilane, phenyldisilane, p-tolyldisilane, mesityldisilane, benzyldisilane, phenetyldisilane, (trimethylsilylmethyl)disilane, 1,1-dimethyldisilane, 1,1-diethyldisilane, 1,1-di-n-propyldisilane, 1,1-di-n-butyldisilane, 1,1-di-n-amyldisilane, 1,1-di-n-hexyldisilane, 1,1-dicyclohexyldisilane, 1,1-diphenyldisilane, 1,1-dimesityldisilane, 1-ethyl-1-methyldisilane, 1-methyl-1-n-propyldisilane, 1-methyl-1-i-propyldisilane, 1-n-butyl-1-methyldisilane, 1-tert-butyl-1-methyldisilane, 1-n-hexyl-1-methyldisilane, 1-cyclohexyl-1-methyldisilane, 1-n-heptyl-1-methyldisilane, 1-methyl-1-n-octyldisilane, 1-n-decyl-1-methyldisilane, 1-methyl-1-phenyldisilane, 1-(p-methylphenetyl)-1-methyldisilane, 1-methyl-1-(beta-phenetyl)disilane, 1-p-tolyl-1-methyldisilane, 1-phenyl-1-ethyldisilane, 1-tert-butyl-1-phenyldisilane, 1-(phenyldimethylsilyl)-1-methyldisilane, 1-(trimethylsilyl)-1-methyldisilane, 1,2-dimethyldisilane, 1,2-diethyldisilane, 1,2-di-n-propyldisilane, 1,2-di-n-butyldisilane, 1,2-di-n-amyldisilane, 1,2-di-n-hexyldisilane, 1,2-dicyclohexyldisilane, 1,2-diphenyldisilane, 1,2-dimesityldisilane, 1-ethyl-2-methyldisilane, 1-methyl-2-n-propyldisilane, 1-methyl-2-i-propyldisilane, 1-n-butyl-2-methyldisilane, 1-tert-butyl-2-methyldisilane, 1-n-hexyl-2-methyldisilane, 1-cyclohexyl-2-methyldisilane, 1-n-heptyl-2-methyldisilane, 1-methyl-2-n-octyldisilane, 1-n-decyl-2-methyldisilane, 1-methyl-2-phenyldisilane, 1-(p-methylphenetyl)-2-methyldisilane, 1-methyl-2-(beta-phenetyl)disilane, 1-p-tolyl-2-methyldisilane, 1-phenyl-2-ethyldisilane, 1-tert-butyl-2-phenyldisilane, 1-(phenyldimethylsilyl)-2-methyldisilane, 1-(trimethylsilyl)-2-methyldisilane, trimethylsilylsilane, triphenylsilylsilane, (tert-butyldimethylsilyl)silane, 1,1,2-trimethyldisilane, 1,1,2-trimethyldisilane, 1,1,2-tri-n-propyldisilane, 1,1,2-tri-n-butyldisilane, 1,1,2-tri-n-amyldisilane, 1,1,2-tri-n-hexyldisilane, 1,1,2-tricyclohexyldisilane, 1,1,2-triphenyldisilane, 1,1,2-trimethyldisilane, 1,1-diethyl-2-methyldisilane, 1,1-dimethyl-2-n-propyldisilane, 1,1-dimethyl-2-i-propyldisilane, 1,1-di-n-butyl-2-methyldisilane, 1,1-di-tert-butyl-2-methyldisilane, 1,1-di-n-hexyl-2-methyldisialne, 1,1-dicyclohexyl-2-methyldisilane, 1,1-di-n-heptyl-2-methyldisilane, 1,1-dimethyl-2-n-octyldisilane, 1,1-dimethyl-2-phenyldisilane, 1,1-di-(p-methylphenetyl)-2-methyldisilane, 1,1-dimethyl-2-(beta-phenetyl)disilane, 1,1-di-p-tolyl-2-methyldisilane, 1,1-diphenyl-2-ethyldisilane, 1,1-di-tert-butyl-2-phenyldisilane, 1,1-di(phenyldimethylsilyl)-2-methyldisilane, 1,1-bis(trimethylsilyl)-2-methyldisilane, 1-ethyl-2,2-dimethyldisilane, 1-methyl-2,2-di-n-propyldisilane, 1-methyl-2,2-di-i-propyldisilane, 1-n-butyl-2,2-dimethyldisilane, 1-tert-butyl-2,2-dimethyldisilane, 1-n-hexyl-2,2-dimethyldisilane, 1-cyclohexyl-2,2-dimethyldisilane, 1-n-heptyl-2,2-dimethyldisilane, 1-methyl-2,2-di-n-octyldisilane, 1-n-decyl-2,2-dimethyldisilane, 1-methyl-2,2-diphenyldisilane, 1-(p-methylphenetyl)-2,2-dimethyldisilane, 1-methyl-2,2-di(beta-phenetyl)disilane, 1-p-tolyl-2,2-di-methyldisilane, 1-phenyl-2,2-diethyldisilane, 1-tert-butyl-2,2-diphenyldisilane, 1-(phenyldimethylsilyl)-2,2-dimethyldisilane, 1-(trimethylsilyl)-2,2-dimethyldisilane, 1,1,1,2-tetramethyldisilane, 1,1,1,2-tetraethyldisilane, 1,1,1,2-tetra-n-propyldisilane, 1,1,1,2-tetra-n-butyldisilane, 1,1,1,2-tetra-n-amyldisilane, 1,1,1,2-tetra-n-hexyldisilane, 1,1,1,2-tetracyclohexyldisilane, 1,1,1,2-tetraphenyldisilane, 1,1,1,2-tetramethyldisilane, 1,1,2,2-tetramethyldisilane, 1,1,2,2-tetraethyldisilane, 1,1,2,2-tetra-n-propyldisilane, 1,1,2,2-tetra-n-butyldisilane, 1,1,2,2-tetra-n-amyldisilane, 1,1,2,2-tetra-n-hexyldisilane, 1,1,2,2-tetracyclohexyldisilane, 1,1,2,2-tetraphenyldisilane, 1,1,2,2-tetramesityldisilane, 1,1,1-triethyl-2-methyldisilane, 1,1,1-trimethyl-2-n-propyldisilane, 1,1,1-trimethyl-2-i-propyldisilane, 1,1,1-tri-n-butyl-2-methyldisilane, 1,1,1-tri-tert-butyl-2-methyldisilane, 1,1,1-tri-n-hexyl-2-methyldisilane, 1,1,1-tricyclohexyl-2-methyldisilane, 1,1,1-tri-n-heptyl-2-methyldisilane, 1,1,1-trimethyl-2-n-octyldisilane, 1,1,1-tri-n-decyl-2-methyldisilane, 1,1,1-trimethyl-2-phenyldisilane, 1,1,1-tri(p-methylphenetyl)-2-methyldisilane, 1,1,1-trimethyl-2-(beta-phenetyl)disilane, 1,1,1-tri-p-tolyl-2-methyldisilane, 1,1,1-triphenyl-2-ethyldisilane, 1,1,1-tri-tert-butyl-2-phenyldisilane, 1,1,1-tri(phenyldimethylsilyl)-2-methyldisilane, 1,1,1-tri(trimethylsilyl)-2-methyldisilane, 1-ethyl-2,2,2-trimethyldisilane, 1-methyl-2,2,2-tri-n-propyldisilane, 1-methyl-2,2,2-tri-i-propyldisilane, 1-n-buty-2,2,2-trimethyldisilane, 1-tert-butyl-2,2,2-trimethyldisilane, 1-n-hexyl-2,2,2-trimethyldisilane, 1-cyclohexyl-2,2,2-trimethyldisilane, 1-n-heptyl-2,2,2-trimethyldisilane, 1-methyl-2,2,2-tri-n-octyldisilane, 1-n-decyl-2,2,2-trimethyldisilane, 1-methyl-2,2,2-triphenyldisilane, 1-(p-methylphenetyl)-2,2,2-trimethyldisilane, 1-methyl-2,2,2-tri(beta-phenetyl)disilane, 1-p-tolyl-2,2,2-trimethyldisilane, 1-phenetyl-2,2,2-triethyldisilane, 1-tert-butyl-2,2,2-triphenyldisilane, 1-(phenyldimethylsilyl)-2,2,2-trimethyldisilane, 1-(trimethylsilyl)-2,2,2-trimethyldisilane, 1,1-dimethyl-2,2-dimethyldisilane, 1,1-dimethyl-2,2-di-n-propyldisilane, 1,1-dimethyl-2,2-di-i-propyldisilane, 1,1-di-n-butyl-2,2-dimethyldisilane, 1,1-di-n-butyl-2,2-dimethyldisilane, 1,1-di-tert-butyl-2,2-dimethyldisilane, 1,1-di-n-hexyl-2,2-dimethyldisilane, 1,1-dicyclohexyl-2,2-dimethyldisilane, 1,1-di-n-heptyl-2,2-dimethyldisilane, 1,1-dimethyl-2,2-di-n-octyldisilane, 1,1-di-n-decyl-2,2-dimethyldisilane, 1,1-dimethyl-2,2-diphenyldisilane, 1,1-di-(p-methylphenetyl)-2,2-dimethyldisilane, 1,1-dimethyl-2,2-di(beta-phenetyl)disilane, 1,1-di-p-tolyl-2,2-dimethyldisilane, 1,1-diphenyl-2,2-dimethyldisilane, 1,1-di-tert-butyl-2,2-diphenyldisilane, 1,1-di(phenyldimethylsilyl)-2,2-dimethyldisilane, 1,1-bis(trimethylsilyl)-2,2-dimethyldisilane, 1,2-diethyl-1,2-dimethyldisilane, 1,2-dimethyl-1,2-di-n-propyldisilane, 1,2-dimethyl-1,2-di-i-propyldisilane, 1,2-di-n-butyl-1,2-dimethyldisilane, 1,2-di-tert-butyl-1,2-dimethyldisilane, 1,2-di-n-hexyl-1,2-dimethyldisilane, 1,2-dicyclohexyl-1,2-dimethyldisilane, 1,2-di-n-heptyl-1,2-dimethyldisilane, 1,2-dimethyl-1,2-di-n-octyldisilane, 1,2-di-n-decyl-1,2-dimethyldisilane, 1,2-dimethyl-1,2-diphenyldisilane, 1,2-di-(p-methylphenetyl)-1,2-dimethyldisilane, 1,2-dimethyl-1,2-di(beta-phenetyl)disilane, 1,2-di-p-tolyl-1,2-dimethyldisilane, 1,2-diphenyl-1,2-diethyldisilane, 1,2-di-tert-butyl-1,2-diphenyldisilane, 1,2-di(phenyldimethylsilyl)-1,2-dimethyldisilane, and 1,2-bis(trimethylsilyl)-1,2-dimethyldisilane.

Of the above hydrosilanes, the underlined are preferable ones.

Examples of the hydrotrisilanes are trisilane, 1-methyltrisilane, 1-ethyltrisilane, 1-n-propyltrisilane, 1-(3,3,3-trifluoropropyl)trisilane, 1-n-butyltrisilane, 1-tert-butyltrisilane, 1-(1-methylpropyl)trisilane, 1-(2-methylpropyl)trisilane, 1-amyltrisilane, 1-n-hexyltrisilane, 1-cyclohexyltrisilane, 1-n-heptyltrisilane, 1-n-octyltrisilane, 1-n-nonyltrisilane, 1-n-decyltrisilane, 1-n-dodecyltrisilane, 1-phenyltrisilane, 1-p-tolyltrisilane, 1-mesityltrisilane, 1-benzyltrisilane, 1-phenetyltrisilane, 1-(trimethylsilylmethyl)trisilane, 2-methyltrisilane, 2-ethyltrisilane, 2-n-propyltrisilane, 2-(3,3,3-trifluoropropyl)trisilane, 2-n-butyltrisilane, 2-tert-butyltrisilane, 2-(1-methylpropyl)trisilane, 2-(2-methylpropyl)trisilane, 2-amyltrisilane, 2-n-hexyltrisilane, 2-cyclohexyltrisilane, 2-n-heptyltrisilane, 2-n-octyltrisilane, 2-n-nonyltrisilane, 2-n-decyltrisilane, 2-n-dodecyltrisilane, 2-phenyltrisilane, 2-p-tolyltrisilane, 2-mesityltrisilane, 2-benzyltrisilane, 2-phenetyltrisilane, 2-(trimetylsilylmethyl)trisilane, 1,1-dimethyltrisilane, 1,1-diethyltrisilane, 1,1-di-n-propyltrisilane, bis(3,3,3-trifluoropropyl)trisilane, 1,1-di-n-butyltrisilane, 1,1-di-tert-butyltrisilane, 1,1-di(1-methylpropyl)trisilane, 1,1-di(2-methylpropyl)trisilane, 1,1-diamyltrisilane, 1,1-di-n-hexyltrisilane, 1,1-dicyclohexyltrisilane, 1,1-di-n-heptyltrisilane, 1,1-di-n-octyltrisilane, 1,1-di-n-nonyltrisilane, 1,1-di-n-decyltrisilane, 1,1-di-n-dodecyltrisilane, 1,1-di-phenyltrisilane, 1,1-di-p-tolyltrisilane, 1,1-dimesityltrisilane, 1,1-dibenzyltrisilane, 1,1-diphenetyltrisilane, 1,1-bis(trimethylsilylmethyl)trisilane, 1,2-dimethyltrisilane, 1,2-diethyltrisilane, 1,2-di-n-propyltrisilane, 1,2-bis(3,3,3-trifluoropropyl)trisilane, 1,2-di-n-butyltrisilane, 1,2-di-tert-butyltrisilane, 1,2-di(1-methylpropyl)trisilane, 1,2-di(2-methylpropyl)trisilane, 1,2-diamyltrisilane, 1,2-di-n-hexyltrisilane, 1,2-dicyclohexyltrisilane, 1,2-di-n-heptyltrisilane, 1,2-di-n-octyltrisilane, 1,2-di-n-nonyltrisilane, 1,2-di-n-decyltrisilane, 1,2-di-n-dodecyltrisilane, 1,2-diphenyltrisilane, 1,2-di-p-tolyltrisilane, 1,2-dimesityltrisilane, 1,2-dibenzyltrisilane, 1,2-diphenetyltrisilane, 1,2-bis(trimethylsilylmethyl)trisilane, 1,3-dimethyltrisilane, 1,3-diethyltrisilane, 1,3-di-n-propyltrisilane, bis(3,3,3-trifluoropropyl)trisilane, 1,3-di-n-butyltrisilane, 1,3-di-tert-butyltrisilane, di(1-methylpropyl)trisilane, di(2-methylpropyl)trisilane, 1,3-diamyltrisilane, 1,3-di-n-hexyltrisilane, 1,3-dicyclohexyltrisilane, 1,3-di-n-heptyltrisilane, 1,3-di-n-octyltrisilane, 1,3-di-n-nonyltrisilane, 1,3-di-n-decyltrisilane, 1,3-di-n-dodecyltrisilane, 1,3-diphenyltrisilane, 1,3-di-p-tolyltrisilane, 1,3-dimesityltrisilane, 1,3-dibenzyltrisilane, 1,3-diphenetyltrisilane, 1,3-bis(trimethylsilylmethyl)trisilane, 1-ethyl-1-methyltrisilane, 1-methyl-1-n-propyltrisilane, 1-methyl-1-(3,3,3-trifluoropropyl)trisilane, 1-methyl-1-i-propyltrisilane, 1-n-butyl-1-methyltrisilane, 1-tert-butyl-1-methyltrisilane, 1-methyl-1-(1-methylpropyl)trisilane, 1-methyl-1-(2-methylpropyl)trisilane, 1-amyl-1-methyltrisilane, 1-n-hexyl-1-methyltrisilane, 1-cyclohexyl-1-methyltrisilane, 1-n-heptyl-1-methyltrisilane, 1-methyl-1-n-octyltrisilane, 1-methyl-1-n-nonyltrisilane, 1-n-decyl-1-methyltrisilane 1-n-dodecyl-1-methyltrisilane, 1-methyl-1-phenyltrisilane, 1-p-tolyl-1-methyltrisilane, 1-methyl-1-mesityltrisilane, 1-benzyl-1-methyltrisilane, 1-methyl-1-phenetyltrisilane, 1-methyl-1-(trimethylsilylmethyl)trisilane, 1-(p-methylphenetyl)-1-methyltrisilane, 1-ethyl-1-phenyltrisilane, 1-tert-butyl-1-phenyltrisilane, 1-ethyl-2-methyltrisilane, 1-methyl-2-n-propyltrisilane, 1-methyl-2-(3,3,3-trifluoropropyl)trisilane, 1-methyl-2-i-propyltrisilane, 1-n-butyl-2-methyltrisilane, 1-tert-butyl-2-methyltrisilane, 1-methyl-2-(1-methylpropyl)trisilane, 1-methyl-2-(2-methylpropyl)trisilane, 1-amyl-2-methyltrisilane, 1-n-hexyl-2-methyltrisilane, 1-cyclohexyl-2-methyltrisilane, 1-n-heptyl-2-methyltrisilane, 1-methyl-2-n-octyltrisilane, 1-methyl-2-n-nonyltrisilane, 1-n-decyl-2-methyltrisilane, 1-n-dodecyl-2-methyltrisilane, 1-methyl-2-phenyltrisilane, 1-p-tolyl-2-methyltrisilane, 1-methyl-2-mesityltrisilane, 1-benzyl-2-methyltrisilane, 1-methyl-2-phenetyltrisilane, 1-methyl-2-(trimethylsilylmethyl)trisilane, 1-(p-methylphenetyl)-2-methyltrisilane, 1-ethyl-2-phenyltrisilane, 1-tert-butyl-2-phenyltrisilane, 1-ethyl-3-methyltrisilane, 1-methyl-3-n-propyltrisilane, 1-methyl-3-(3,3,3-trifluoropropyl)trisilane, 1-methyl-3-i-propyltrisilane, 1-n-butyl-3-methyltrisilane, 1-tert-butyl-3-methyltrisilane, 1-methyl-3-(1-methylpropyl)trisilane, 1-methyl-3-(2-methylpropyl)trisilane, 1-amyl-3-methyltrisilane, 1-n-hexyl-3-methyltrisilane, 1-cyclohexyl-3-methyltrisilane, 1-n-heptyl-3-methyltrisilane, 1-methyl-3-n-octyltrisilane, 1-methyl-3-n-nonyltrisilane, 1-n-decyl-3-methyltrisilane, 1-n-dodecyl-3-methyltrisilane, 1-methyl-3-phenyltrisilane, 1-p-tolyl-3-methyltrisilane, 1-methyl-3-mesityltrisilane, 1-benzyl-3-methyltrisilane, 1-methyl-3-phenetyltrisilane, 1-methyl-3-(trimethylsilylmethyl)trisilane, 1-(p-methylphenetyl)-3-methyltrisilane, 1-ethyl-3-phenyltrisilane, 1-tert-butyl-3-phenyltrisilane, 1,1,1-trimethyltrisilane, 1,1,1-triethyltrisilane, 1,1,1-tri-n-propyltrisilane, 1,1,1-tris(3,3,3-trifluoropropyl)trisilane, 1,1,1-tri-n-butyltrisilane, 1,1,1-tri-tert-butyltrisilane, 1,1,1-tri(1-methylpropyl)trisilane, 1,1,1-tri(2-methylpropyl)trisilane, 1,1,1-triamyltrisilane, 1,1,1-tri-n-hexyltrisilane, 1,1,1-tricyclohexyltrisilane, 1,1,1-tri-n-heptyltrisilane, 1,1,1-tri-n-octyltrisilane, 1,1,1-tri-n-nonyltrisilane, 1,1,1-tri-n-dodecyltrisilane, 1,1,1-triphenyltrisilane, 1,1,1-tri-p-tolyltrisilane, 1,1,1-trimesityltrisilane, 1,1,1-tribenzyltrisilane, 1,1,1-triphenetyltrisilane, 1,1,1-tris(trimethylsilylmethyl)trisilane, 1-ethyl-1,1-dimethyltrisilane, 1-methyl-1,1-di-n-propyltrisilane, 1-methyl-1,1-bis(3,3,3-trifluoropropyl)trisilane, 1-methyl-1,1-di-i-propyltrisilane, 1-n-butyl-1,1-dimethyltrisilane, 1-tert-butyl-1,1-dimethyltrisilane, 1-methyl-1,1-di(1-methylpropyl)trisilane, 1-methyl-1,1-di(2-methylpropyl)trisilane, 1-amyl-1,1-dimethyltrisilane, 1-n-hexyl-1,1-dimethyltrisilane, 1-cyclohexyl-1,1-dimethyltrisilane, 1-n-heptyl-1,1-dimethyltrisilane, 1-methyl-1,1-di-n-octyltrisilane, 1-methyl-1,1-di-n-nonyltrisilane, 1-n-decyl-1,1-dimethyltrisilane, 1-n-dodecyl-1,1-dimethyltrisilane, 1-methyl-1,1-diphenyltrisilane, 1-p-tolyl-1,1-dimethyltrisilane, 1-methyl-1,1-dimesityltrisilane, 1-benzyl-1,1-dimethyltrisilane, 1-methyl-1,1-diphenetyltrisilane, 1-methyl-1,1-bis(trimethylsilylmethyl)trisilane, 1-(p-methylphenetyl)-1,1-dimethyltrisilane, 1-ethyl-1,1-diphenyltrisilane, 1-tert-butyl-1,1-diphenyltrisilane, 1,1,2-trimethyltrisilane, 1,1,2-triethyltrisilane, 1,1,2-tri-n-propyltrisilane, 1,1,2-tris(3,3,3-trifluoropropyl)trisilane, 1,1,2-tri-n-butyltrisilane, 1,1,2-tri-tert-butyltrisilane, 1,1,2-tri(1-methylpropyl)trisilane, 1,1,2-tri(2-methylpropyl)trisilane, 1,1,2-triamyltrisilane, 1,1,2-tri-n-hexyltrisilane, 1,1,2-tricyclohexyltrisilane, 1,1,2-tri-n-heptyltrisilane, 1,1,2-tri-n-octyltrisilane, 1,1,2-tri-n-nonyltrisilane, 1,1,2-tri-n-decyltrisilane, 1,1,2-tri-n-dodecyltrisilane, 1,1,2-triphenyltrisilane, 1,1,2-tri-p-tolyltrisilane, 1,1,2-trimesityltrisilane, 1,1,2-tribenzyltrisilane, 1,1,2-triphenetyltrisilane, 1,1,2-tris(trimesitylsilylmethyl)trisilane, 1,1,3-trimethyltrisilane, 1,1,3-triethyltrisilane, 1,1,3-tri-n-propyltrisilane, 1,1,3-tris(3,3,3-trifluoropropyl)trisilane, 1,1,3-tri-n-butyltrisilane, 1,1,3-tri-tert-butyltrisilane, 1,1,3-tri(1-methylpropyl)trisilane, 1,1,3-tri(2-methylpropyl)trisilane, 1,1,3-triamyltrisilane, 1,1,3-tri-n-hexyltrisilane, 1,1,3-tricyclohexyltrisilane, 1,1,3-tri-n-heptyltrisilane, 1,1,3-tri-n-octyltrisilane, 1,1,3-tri-n-nonyltrisilane, 1,1,3-tri-n-decyltrisilane, 1,1,3-tri-n-dodecyltrisilane, 1,1,3-triphenyltrisilane, 1,1,3-tri-p-tolyltrisilane, 1,1,3-trimesityltrisilane, 1,1,3-tribenzyltrisilane, 1,1,3-triphenetyltrisilane, 1,1,3-tris(trimethylsilylmethyl)trisilane, 1,2,3-trimethyltrisilane, 1,2,3-triethyltrisilane, 1,2,3-tri-n-propyltrisilane, 1,2,3-tris(3,3,3-trifluoropropyl)trisilane, 1,2,3-tri-n-butyltrisilane, 1,2,3-tri-tert-butyltrisilane, 1,2,3-tri(1-methylpropyl)trisilane, 1,2,3-tri(2-methylpropyl)trisilane, 1,2,3-triamyltrisilane, 1,2,3-tri-n-hexyltrisilane, 1,2,3-tricyclohexyltrisilane, 1,2,3-tri-n-heptyltrisilane, 1,2,3-tri-n-octyltrisilane, 1,2,3-tri-n-nonyltrisilane, 1,2,3-tri-n-decyltrisilane, 1,2,3-tri-n-dodecyltrisilane, 1,2,3-triphenyltrisilane, 1,2,3-tri-p-tolytrisilane, 1,2,3-trimesityltrisilane, 1,2,3-tribenzyltrisilane, 1,2,3-triphenetyltrisilane, 1,2,3-tris(trimethylsilylmethyl)trisilane, 1,1-diethyl--2-2-methyltrisilane, 1,1-dimethyl-2-n-propyltrisilane, 1,1-dimethyl-2-i-propyltrisilane, 1,1-di-n-butyl-2-methyltrisilane, 1,1-di-tert-butyl-2-methyltrisilane, 1,1-di-n-hexyl-2-methyltrisilane, 1,1-dicyclohexyl-2-methyltrisilane, 1,1-di-n-heptyl-2-methyltrisilane, 1,1-dimethyl-2-n-octyltrisilane, 1,1-di-n-decyl-2-methyltrisilane, 1,1-dimethyl-2-phenyltrisilane, 1,1-di(p-methylphenetyl)-2-methyltrisilane, 1,1-dimethyl-2-(betaphenetyl)trisilane, 1,1-di-p-tolyl-2-methyltrisilane, 1,1-diphenyl-2-ethyltrisilane, 1,1-di-tert-butyl-2-phenyltrisilane, 1,1-di(phenyldimethylsilyl)-2-methyltrisilane, 1,1-bis(trimethylsilyl)-2-methyltrisilane, 1,1-diethyl-3-methyltrisilane, 1,1-dimethyl-3-n-propyltrisilane, 1,1-dimethyl-3-i-propyltrisilane, 1,1-di-n-butyl-3-methyltrisilane, 1,1-di-tert-butyl-3-methyltrisilane, 1,1-di-n-hexyl-3-methyltrisilane, 1,1-dicyclohexyl-3-methyltrisilane, 1,1-di-n-heptyl-3-methyltrisilane, 1,1-dimethyl-3-n-octyltrisilane, 1,1-di-n-decyl-3-methyltrisilane, 1,1-dimethyl-3-phenyltrisilane, 1,1-di-(p-methylphenetyl)-3-methyltrisilane, 1,1-dimethyl-3-(beta-phenetyl)trisilane, 1,1-di-p-tolyl-3-methyltrisilane, 1,1-diphenyl-3-ethyltrisilane, 1,1-di-tert-butyl-3-phenyltrisilane, 1,1-di(phenyldimethylsilyl)-3-methyltrisilane, 1,1-bis(trimethylsilyl)-3-methyltrisilane, 1,2-diethyl-3-methyltrisilane, 1,2-dimethyl-3-n-propyltrisilane, 1,2-dimethyl-3-i-propyltrisilane, 1,2-di-n-butyl-3-methyltrisilane, 1,2-di-tert-butyl-3-methyltrisilane, 1,2-di-n-hexyl-3-methyltrisilane, 1,2-dicyclohexyl-3-methyltrisilane, 1,2-di-n-heptyl-3-methyltrisilane, 1,2-dimethyl-3-n-octyltrisilane, 1,2-di-n-decyl-3-methyltrisilane, 1,2-dimethyl-3-phenyltrisilane, 1,2-di(p-methylphenetyl)-3-methyltrisilane, 1,2-dimethyl-3-(beta-phenetyl)trisilane, 1,2-di-p-tolyl-3-methyltrisilane, 1,2-diphenyl-3-ethyltrisilane, 1,2-di-tert-butyl-3-phenyltrisilane, 1,2-di(phenyldimethylsilyl)-3-methyltrisilane, and 1,2-bis(trimethylsilyl)-3-methyltrisilane.

Of these hydroxytrisilanes, the underlined are preferable ones.

In the first embodiment of this invention, the hydrosilanes are reacted using the mixture containing the metallocene compound and the silyl compound as a catalyst; the reaction is usually a dehydrocondensation reaction and the reaction conditions are as follows.

The reaction temperature is 0° to 250° C., preferably 25° to 210° C.

The properties of the resulting polysilanes can be controlled, as will be later described, depending on purposes by selecting or changing the reaction temperature within the above range.

The reaction time varies with the reaction temperature or the amount of the catalyst; it is usually 5 minutes to 24 hours, preferably 30 minutes to 3 hours.

The reaction may be performed in the presence or absence of a solvent. Examples of the solvent are hydrocarbon solvents such as toluene, xylene, heptane, decane and dodecane, ether solvents such as diethyl ether, isopropyl ether, methyl butyl ether, dimethoxyethane, tetrahydrofuran, dioxane, and diglyme; amide solvents such as dimethyl formamide, and hexamethylphosphoric triamide; ester solvents such as ethyl acetate and butyl acetate; and sulfoxides such as dimethyl sulfoxide.

It is advisable to conduct the reaction under an atmosphere of an inert gas such as argon, nitrogen, or the like.

The structure of the thus obtained polysilanes contains the recurring units of the following formulas (15), (16) and/or (17).

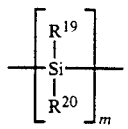 (15)

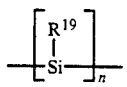 (16)

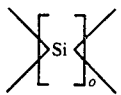 (17)

wherein R$^{19}$ denotes hydrogen, an alkyl group, a substituted alkyl group, a phenyl group, a substituted phenyl group or a RR'R" Si-type silyl group substituted with an alkyl group or a phenyl group, R$^{20}$ is hydrogen, an alkyl group, a substituted alkyl group, a phenyl group, a substituted phenyl group or a RR'R" Si-type silyl group substituted with an alkyl group or a phenyl group, R, R' and R" each denote hydrogen, an alkyl group having 1 to 12 carbon atoms, an aralkyl group or an aryl group having 6 to 12 carbon atoms, and they may be the same or different.

The structure of the product is ascertained via IR, $^1$HNMR, $^{13}$CNMR, $^{29}$SiNMR, UV and GPC.

The proportions of the recurring units represented by formulas (15), (16) and (17) vary with the reaction temperature. For example, when the reaction temperature is low (0° to 60° C.), polysilanes are obtained wherein the proportion of the linear structure or the monocyclic structure is high and the proportion of the branched structure or the crosslinked structure is low. At this time, the degree of polymerization is 2 or more, usually 20 to 100. Moreover, n/m is usually 0 to 10, preferably 0 to 5; o/m is usually 0 to 10, preferably 0 to 5.

There is a tendency that the higher the reaction temperature, the larger the n and/or o value. At 180° to 250° C., the polysilanes are obtained wherein the proportion of the branched structure, the crosslinked structure or the condensed polycyclic structure is high. The degree of polymerization is 2 or more, usually 6 to 2,000. On this occasion, since m, n and o seem likely to be 0, the ranges of n/m and o/n cannot be definitely indicated. However, n/m is usually 0 to 1,000, preferably 0 to 100, and o/n is usually 0 to 1,000, preferably 0 to 100.

At the intermediate temperature (60° to 180° C.), the degree of polymerization is 2 or more, usually 10 to 1,000; n/m is usually 0 to 100, preferably 0 to 20, and o/n is usually 0 to 100, preferably 0 to 20.

The ratio of m, n and o can be controlled by the type of the hydrosilane or, when using two or more types of the hydrosilanes, their proportions.

In the second embodiment of this invention, the mixture containing the metallocene compound (A) of formula (1) and the metallic hydride (B') of formula (6) is used as a catalyst.

The metallocene compound of formula (1) is the same as used in the first embodiment of this invention.

Examples of the metallic hydride of formula (6) are LiH, NaH, KH, CaH$_2$, AlH$_3$, MeAlH$_2$, EtAlH$_2$, n-PrAlH$_2$, i-PrAlH$_2$, n-BuAlH$_2$, i-BuAlH$_2$, sec-BuAlH$_2$, t-BuAlH$_2$, Me$_2$AlH, Et$_2$AlH, n-Pr$_2$AlH, i-Pr$_2$AlH, n-Bu$_2$AlH, i-Bu$_2$AlH, sec-Bu$_2$AlH, t-Bu$_2$AlH, LiAlH$_4$, LiAl(Et)$_2$H$_2$, LiAl(n-Pr)$_2$H$_2$, LiAl(i-Pr)$_2$H$_2$, LiAl(n-Bu)$_2$H$_2$, LiAl(i-Bu)$_2$H$_2$, LiAl(sec-Bu)$_2$H$_2$, LiAl(t-Bu)$_2$H$_2$, LiAl(Et)$_3$H, LiAl(n-Pr)$_3$H, LiAl(i-Pr)$_3$H, LiAl(n-Bu)$_3$H, LiAl(i-Bu)$_3$H, LiAl(sec-Bu)$_3$H, LiAl(OMe)$_3$H, LiAl(OEt)$_3$H, LiAl(O-t-Bu)$_3$H, NaAl(OCH$_2$CH$_2$-OMe)$_3$H$_2$, BH$_3$, [(CH$_3$)$_2$CHCH(CH$_3$)]$_2$BH, LiBH$_4$, LiB(sec-Bu)$_3$H, LiB(Et)$_3$H, Li(9-BBN)H, NaBH$_4$, KBH$_4$, Me$_4$NBH$_4$, Et$_4$NBH$_4$, LiD, NaD, KD, CaD$_2$, AlD$_3$, MeAlD$_2$, EtAlD$_2$, n-PrAlD$_2$, i-PrAlD$_2$, n-BuAlD$_2$, i-BuAlD$_2$, sec-BuAlD$_2$, t-BuAlD$_2$, Me$_2$AlD, Et$_2$AlD, n-Pr$_2$AlD, i-Pr$_2$AlD, n-Bu$_2$AlD, i-Bu$_2$AlD, sec-Bu$_2$AlD, t-Bu$_2$AlD, LiAlD$_4$, LiAl(Et)$_2$D$_2$, LiAl(n-Pr)$_2$D$_2$, LiAl(i-Pr)$_2$D$_2$, LiAl(n-Bu)$_2$D$_2$, LiAl(i-Bu)$_2$D$_2$, LiAl(sec-Bu)$_2$D$_2$, LiAl(t-Bu)$_2$D$_2$, LiAl(Et)$_3$D, LiAl(n-Pr)$_3$D, LiAl(i-Pr)$_3$D, LiAl(n-Bu)$_3$D, LiAl(i-Bu)$_3$D, LiAl(sec-Bu)$_3$D, LiAl(OMe)$_3$D, LiAl(OEt)$_3$D, LiAl(O-t-Bu)$_3$D, NaAl(OCH$_2$CH$_2$OMe)$_3$D$_2$, BD$_3$, [(CH$_3$)$_2$CHCH(CH$_3$)]$_2$BD, LiBD$_4$, LiB(sec-Bu)$_3$D, LiB(Et)$_3$D, Li(9-BBN)D, NaBD$_4$, KBD$_4$, Me$_4$NBD$_4$ and Et$_4$NBD$_4$.

Of the above metallic hydrides, the underlined are preferable ones.

The metallic hydrides can be used either singly or in combination.

The proportion of the metallocene compound is usually 0.01 to 10 mols, preferably 0.1 to 5 mols per 100 mols of the hydrosilanes. The proportion of the metallic hydride is usually 0.005 to 50 mols, preferably 0.05 to 20 mols per 100 mols of the hydrosilane.

Additives may be added to the catalyst. Examples of the additives are crown ethers such as 12-crown-4, 15-crown-5, 18-crown-6, benzo-12-crown-4, benzo-15-crown-5 and benzo-18-crown-6, and diamines such as tetramethylethylenediamine. The amounts of the additives are usually 0.005 to 50 mols, preferably 0.055 to 20 mols per 100 mols of the hydrosilanes.

In the second embodiment of this invention, the polysilanes are produced by reacting the hydrosilanes using the mixture of the metallocene compound and the metallic hydride as a catalyst.

Said hydrosilanes are the same hydromonosilanes, hydrodisilanes, and hydrotrisilanes as used in the first embodiment of this invention. They can be used either singly or in combination.

In the second embodiment of this invention, the hydrosilanes are reacted using the mixture of the metallocene compound and the metallic hydride as the catalyst. The reaction is usually a dehydrocondensation reaction and the conditions are as follows.

The reaction temperature is 0° to 250° C., preferably 25° to 210° C.

The properties of the polysilanes can be controlled, as will be later described, depending on purposes by selecting or changing the reaction temperature within the above range.

The reaction time varies with the reaction temperature or the amount of the catalyst; it is usually 5 minutes to 24 hours, preferably 30 minutes to 3 hours.

The reaction may be performed in the presence or absence of a solvent. Examples of the solvent are hydrocarbon solvents such as toluene, xylene, heptane, decane and dodecane, ether solvents such as diethyl ether, isopropyl ether, methyl butyl ether, dimethoxyethane, tetrahydrofuran, dioxane, and diglyme; amide solvents such as dimethyl formamide, and hexamethylphosphoric triamide; ester solvents such as ethyl acetate and butyl acetate; and sulfoxides such as dimethyl sulfoxide.

It is advisable to conduct the reaction under an atmosphere of an inert gas such as argon, nitrogen, or the like.

The structure of the thus obtained polysilanes contains the recurring units of formulas (15), (16) and/or (17).

The structure of the product is ascertained via IR, $^1$HNMR, $^{13}$CNMR, $^{29}$SiNMR, UV and GPC.

The proportions of the recurring units represented by formulas (15), (16) and (17) vary with the reaction temperature. For example, when the reaction temperature is low (0° to 60° C.), polysilanes are obtained wherein the proportion of the linear structure or the monocyclic structure is high and the proportion of the branched structure or the crosslinked structure is low. At this time, the degree of polymerization is 2 or more, usually 20 to 100. Moreover, n/m is usually 0 to 10, preferably 0 to 5; o/m is usually 0 to 10, preferably 0 to 5.

There is a tendency that the higher the reaction temperature, the larger the n and/or o value. At 180° to 250° C., the polysilanes are obtained wherein the proportion of the linear structure of the monocyclic structure is low and the proportion of the branched structure, the crosslinked structure or the condensed polycyclic structure is high. The degree of polymerization is 2 or more, usually 6 to 2,000. On this occasion, since m, n and o seem likely to be 0, the ranges of n/m and o/n cannot be definitely indicated. However, n/m is usually 0 to 1,000, preferably 0 to 100, and o/n is usually 0 to 1,000, preferably 0 to 100.

At the intermediate temperature (60° to 180° C.), the degree of polymerization is 2 or more, usually 10 to 1,000; n/m is usually 0 to 100, preferably 0 to 20, and o/n is usually 0 to 100, preferably 0 to 20.

The ratio of m, n and o can be controlled by the type of the hydrosilane or, when using two or more types of the hydrosilanes, their proportions.

This invention is industrially quite useful because in producing the polysilanes from the hydrosilanes, the polymer having the higher degree of polymerization than in case of using the known catalyst can be produced.

EXAMPLES

The following Examples illustrate this invention specifically. However, this invention is not limited thereto.

EXAMPLE 1

A 100 ml glass flask fitted with a magnetic stirrer was charged with 166 mg (0.437 mmol) of Cp$_2$HfCl$_2$ and 369 mg (0.784 mmol) of (Me$_3$Si)$_3$SiLi.THF$_3$ as a catalyst under an argon atmosphere. Then, 5.0 ml (40 mmols) of PhSiH$_3$ was added at room temperature.

Immediately after the addition, vigorous occurrence of a gas was observed, and the reaction product turned yellowish brown. The vigorous occurrence of the gas continued for about 10 minutes, and the reaction then became mild. Twenty three hours later, the reaction product was purified via a column of 55 g of florisil together with 500 ml of toluene as a solvent.

When toluene was distilled off in vacuo, 4.2 g of a white solid polysilane was obtained in an yield of 96% by weight as PhSiH$_3$.

Properties of the resulting polysilane are as follows.
GPC: Mw=6800, Mn=3900
IR: 915 cm$^{-1}$, 2104 cm$^{-1}$
$^1$HNMR: δ 4.1–5.3 (1H), 6.7–7.8 (5.5H)
UV (THF): 258 nm, 295 nm (shoulder)

The composition of the recurring units of the resulting polysilane was found from the above analytical results, and the ratio of the units of formulas (15) and (16) was n/m=0.1.

EXAMPLE 2

A polysilane was produced as in Example 1 except that stirring was conducted at 110° C. for 2 hours. Consequently, a yellow polysilane powder was obtained in a yield of about 100% by weight as PhSiH$_3$.
GPC: Mw=2300, Mn=1500
IR: 915 cm$^{-1}$, 2100 cm$^{-1}$
$^1$HNMR: δ 4.0–5.9 (1H), 6.6–8.0 (6.8H)
UV (THF): 254 nm, 309 nm (shoulder)

The composition of the recurring units of the resulting polysilane was found from the above analytical results, and the ratio of the units of formulas (15) and (16) was n/m=2.78.

EXAMPLE 3

A polysilane was produced as in Example 1 except that stirring was conducted at 100° C. for 1 hour and then at 200° C. for 2 hours. As a result, a yellow polysilane powder was obtained in a yield of 96% by weight as PhSiH$_3$.
GPC: Mw=1100, Mn=1000
IR: 2100 cm$^{-1}$
$^1$HNMR: δ 4.5–6.0 (1H), 6.5–8.1 (12H)
UV (THF): 254 nm (A hem of absorption continued up to 370 nm.)

The composition of the recurring units of the resulting polysilane was found from the above analytical results, and the ratio of the units of formulas (15) and (16) was n/m=5.1.

EXAMPLE 4

A polysilane was produced as in Example 1 except that 182 mg (0.623 mmol) of Cp$_2$ZrCl$_2$ and 372 mg (0.790 mmol) of (Me$_3$Si)$_3$SiLi THF$_3$ were used as a catalyst, and stirring was conducted at 110° C. for 2 hours. There resulted a yellow polysilane powder in a yield of 92% by weight as PhSiH$_3$.
GPC: Mw=1500, Mn=1000
IR: 915 cm$^{-1}$, 2100 cm$^{-1}$
$^1$HNMR: δ 3.9–5.9 (1H), 6.6–8.1 (8.7H)
UV (THF): 258 nm, 309 nm (shoulder)

The composition of the recurring units of the resulting polysilane was found from the above analytical results, and the ratio of the units of formulas (15) and (16) was n/m=1.41.

EXAMPLE 5

A polysilane was produced as in Example 1 except that 174 mg (0.594 mmol) of Cp$_2$ZrCl$_2$ and 252 mg (0.843 mmol) of Ph$_3$SiK were used as a catalyst. There resulted a colorless sticky polysilane in a yield of 93% by weight as PhSiH$_3$.
GPC: Mw=3300, Mn=2500
IR: 915 cm$^{-1}$, 2106 cm$^{-1}$
$^1$HNMR:δ 4.1–5.3 (1H), 6.7–7.8 (5.5H)
UV (THF): 256 nm, 292 nm (shoulder)

The composition of the recurring units of the resulting polysilane was found from the above analytical results, and the ratio of the units of formulas (15) and (16) was n/m=0.2.

EXAMPLE 6

A polysilane was produced as in Example 1 except that 148 mn (0.594 mmol) of $Cp_2TiCl_2$ and 238 mg (0.843 mmol) of $Ph_3SiNa$ were used as a catalyst. There resulted a colorless sticky polysilane in a yield of 9.1% by weight as $PhSiH_3$.

GPC: Mw=2800, Mn=220
IR: 915 cm$^{-1}$, 2106 cm$^{-1}$
$^1$HNMR:δ 4.2–5.3 (1H), 6.7–7.9 (5.9H)
UV (THF): 252 nm, 293 nm (shoulder)

The composition of the recurring units of the resulting polysilane was found from the above analytical results, and the ratio of the units of formulas (15) and (16) was n/m=0.18.

EXAMPLE 7

A 100 ml glass flask fitted with a magnetic stirrer was charged with 195 mg (0.514 mmol) of $Cp_2HfCl_2$, 60 mg (1.5 mmols) of KH and 64 mg (0.24 mmol) of 18-crown-6 as a catalyst under an argon atmosphere. $PhSiH_3$ (5.0 ml, 40 mmols) was added thereto, and the mixture was heated to 100° C. Consequently, occurrence of a gas was observed and the reaction product turned yellowish brown.

Six hours later, the reaction product was purified by passing through a column of 55 g of florisil together with 500 ml of toluene as a solvent.

When toluene was distilled off in vacuo, 3.9 g of a pale yellow sticky polysilane was obtained in a yield of 90% by weight as $PhSiH_3$.

GPC: Mw=3500, Mn=2500
IR: 915 cm$^{-1}$, 2104 cm$^{-1}$
$^1$HNMR:δ 4.1–5.4 (1H), 6.6–7.8 (7.4H)
UV (THF): 258 nm, 300 nm (shoulder)

The composition of the recurring units of the resulting polysilane was found from the above analytical results, and the ratio of the units of formulas (15) and (16) was n/m=2.08.

EXAMPLE 8

A 100 ml glass flask fitted with a magnetic stirrer was charged with 210 mg (0.554 mmol) of $Cp_2HfCl_2$, 60 mg (1.5 mmols) of KH, 26 mg (1.1 mmols) of NaH and 64 mg (0.24 mmol) of 18-crown-6 under an argon atmosphere. $PhSiH_3$ (5.0 ml, 40 mmols) was added thereto, and heating was conducted at 100° C. for 1 hour and then at 200° C. for 2 hours. The reaction product was purified as in Example 7. As a result, a yellow polysilane power was obtained in a yield of 73% by weight as $PhSiH_3$.

GPC: Mw=940, Mn=900
IR: 2100 cm$^{-1}$
$^1$HNMR:δ 5.2–5.9 (1H), 6.4–8.1 (33H)
UV (THF): 254 nm (A hem of absorption continued up to 380 nm.)

The composition of the recurring units of the resulting polysilane was found from the above analytical results, and the ratio of the units of formulas (15) and (16) was n/m=5.6.

EXAMPLE 9

$Cp_2ZrCl_2$ (182 mg, 0.623 mmol) and 9 mg (0.2 mmol) of $LiAlH_4$ were used as a catalyst, and a THF (5.0 ml) solution of $PhSiH_3$ (5.0 ml, 40 mmols) was added thereto, followed by stirring at room temperature for 24 hours.

The reaction product was purified as in Example 7. There resulted a white sticky polysilane in a yield of 100% by weight as $PhSiH_3$.

GPC: Mw=5600, Mn=3500
IR: 915 cm$^{-1}$, 2106 cm$^{-1}$
$^1$HNMR:δ 4.1–5.4 (1H), 6.6–7.9 (5.6H)
UV (THF): 254 nm, 293 nm (shoulder)

The composition of the recurring units of the resulting polysilane was found from the above analytical results, and the ratio of the units of formulas (15) and (16) was n/m=0.12.

EXAMPLE 10

A polysilane was produced as in Example 9 except that 148 mg (0.594 mmol) of $Cp_2TiCl_2$ was used as a catalyst. There resulted a colorless sticky polysilane in a yield of 96% by weight as $PhSiH_3$.

GPC: Mw=3500, Mn=2500
IR: 915 cm$^{-1}$, 2104 cm$^{-1}$
$^1$HNMR:δ 4.2–5.3 (1H), 6.7–7.9 (5.7H)
UV (THF): 252 nm, 292 nm (shoulder)

The composition of the recurring units of the resulting polysilane was found from the above analytical results, and the ratio of the units of formulas (15) and (16) was n/m=0.14.

EXAMPLE 11

A polysilane was produced as in Example 7 except that 210 mg (0.554 mmol) of $Cp_2HfCl_2$, 65 mg (1.6 mmols) of KD and 192 mg (0.726 mmol) of 18-crown-6 were used as a catalyst. There resulted 3.7 g of a pale yellow sticky polysilane in a yield of 85% by weight as $PhSiH_3$.

GPC: Mw=3200, Mn=2100
IR: 915 cm$^{-1}$, 2106 cm$^{-1}$
$^1$HNMR:δ 4.2–5.5 (1H), 6.6–7.9 (6.9H)
UV (THF): 254 nm, 302 nm (shoulder)

The composition of the recurring units of the resulting polysilane was found from the above analytical results, and the ratio of the units of formulas (15) and (16) was n/m=2.63.

EXAMPLE 12

$Cp_2HfCl_2$ (143 mg, 0.376 mmol), 84 mg (2.1 mmols) of KH and 618 mg (2.34 mmols) of 18-crown-6 were used as a catalyst, and 3.6 g (31 mmols) of n-HexSiH$_8$ was added thereto. The mixture was heated at 100° C. for 1 hour, at 150° C. for 1 hour and at 200° C. for 2 hours.

The reaction product was purified as in Example 7. There resulted a pale yellow sticky polysilane in a yield of 83% by weight as n-HexsiH$_8$.

GPC: Mw=1700, Mn=1600
IR: 2064 cm$^{-1}$
$^1$HNMR:δ 0.8–2.0 (96H), 4.9–5.2 (1H)
UV (THF): 265 nm

The composition of the recurring units of the resulting polysilane was found from the above analytical results, and the ratio of the units of formulas (15) and (16) was n/m=6.3.

EXAMPLE 13

$Cp_2HfCl_2$ (64 mg, 0.17 mmol), 30 mg (0.76 mmol) of KH and 249 mg (0.942 mmol) of 18-crown-6 were added as a catalyst, and 2.5 g (17 mmols) of n-HexSiH$_2$-SiH$_3$ was added thereto. The mixture was heated at 100° C. for 1 hour and at 150° C. for 1 hour.

The reaction product was purified as in Example 7. There resulted a dark red sticky polysilane in a yield of 75% by weight as n-HexSiH$_2$SiH$_3$.

GPC: Mw=14000, Mn=4600
IR: 2106 cm$^{-1}$
$^1$HNMR:δ 1.0-2.2 (21H), 3.6-5.0 (1H)
UV (THF): 428 nm

What is claim is:

1. A process for producing polysilanes, which comprises dehydrocondensing hydrosilanes selected from the group consisting of hydromonosilanes, hydrodsilanes, hydrotrisilanes and mixtures thereof in the presence of a catalyst comprising a mixture of (A) a metallocene compound represented by formula (1)

$$LL'MCl_2 \qquad (1)$$

wherein M denotes Ti, Zr or Hf, L and L' are each selected from unsubstituted cyclopentadienyl, cyclopentadienyl substituted with an alkyl group having 1 to 6 carbon atoms, cyclopentadienyl substituted with a silyl group represented by formula (2)

$$R^1R^2R^3Si- \qquad (2)$$

wherein R$^1$, R$^2$ and R$^3$ are each selected from hydrogen, an alkyl group having 1 to 12 carbon atoms, an aralkyl group or an aryl group having 6 to 12 carbon atoms, and they may be the same or different, unsubstituted indenyl, indenyl substituted with an alkyl group having 1 to 6 carbon atoms or indenyl substituted with the silyl group of formula (2), and L and L' may be the same or different and may be crosslinked with alkylene having 1 to 4 carbon atoms or silylene represented by formula (3)

$$\begin{array}{c} R^7 \\ | \\ -Si- \\ | \\ R^8 \end{array} \qquad (3)$$

wherein R$^7$ and R$^8$ each denote hydrogen, an alkyl group having 1 to 12 carbon atoms, an aralkyl group or an aryl group having 6 to 12 carbon atoms, and they may be the same or different, and (B) a silyl compound represented by formula (4)

$$R^9R^{10}R^{11}SiA \qquad (4)$$

wherein R$^9$, R$^{10}$ and R$^{11}$ are each selected from a linear or branched alkyl group having 1 to 12 carbon atoms, an aralkyl group, an aryl group having 6 to 12 carbon atoms or a silyl group represented by formula (5)

$$R^{12}R^{13}R^{14}Si \qquad (5)$$

wherein R$^{12}$, R$^{13}$ and R$^{14}$ are selected from an alkyl group having 1 to 8 carbon atoms or an aryl group, and they may be the same or different, and A denotes Li, Na or K.

2. A process for producing polysilanes, which comprises dehydrocondensing hydrosilanes selected from the group consisting of hyromonosilanes, hydrodisilanes, hydrotrisilanes and mixtures thereof in the presence of a catalyst comprising a mixture of (A) a metallocene compound represented by formula (1)

$$LL'MCl_2 \qquad (1)$$

wherein M denotes Ti, Zr or Hf, L and L' are each selected from unsubstituted cyclopentadienyl, cyclopentadienyl substituted with an alkyl group having 1 to 6 carbon atoms, cyclopentadienyl substituted with a silyl group represented by formula (2)

$$R^1R^2R^3Si- \qquad (2)$$

wherein R$^1$, R$^2$ and R$^3$ are each selected from hydrogen, an alkyl group having 1 to 12 carbon atoms, an aralkyl group or an aryl group having 6 to 12 carbon atoms, and they may be the same or different, unsubstituted indenyl, indenyl substituted with an alkyl group having 1 to 6 carbon atoms or indenyl substituted with the silyl group of formula (2), and L and L' may be the same or different and may be crosslinked with alkylene having 1 to 4 carbon atoms or silylene represented by formula (3)

$$\begin{array}{c} R^7 \\ | \\ -Si- \\ | \\ R^8 \end{array} \qquad (3)$$

wherein R$^7$ and R$^8$ each denote hydrogen, an alkyl group having 1 to 12 carbon atoms, an aralkyl group or an aryl group having 6 to 12 carbon atoms, and they may be the same or different, and (B') a metallic hydride represented by formula (6)

$$A'X_n \qquad (6)$$

wherein A' denotes Li, Na, K, Ca, Al, R$^4{}_{(3-n)}$Al, LiAl, LiAlR$^5{}_{(4-n)}$, NaAlR$^5{}_{(4-n)}$, B, R$^4{}_{(3-n)}$B, LiB, LiBR$^5$, NaB, KB or R$^6$B, R$^4$ denotes an alkyl group having 1 to 5 carbon atoms, R$^5$ denotes an alkyl or alkoxyl group having 1 to 8 carbon atoms, R$^6$ denotes a quaternary ammonium group having 1 to 4 carbon atoms, provided when R$^4$, R$^5$ and R$^6$ are present in plural number, they may be the same or different, X denotes hydrogen or heavy hydrogen, and n is an integer of 1 to 4.

* * * * *